(12) United States Patent
Lang et al.

(10) Patent No.: US 9,038,953 B2
(45) Date of Patent: May 26, 2015

(54) AIRCRAFT THERMAL INSULATION

(75) Inventors: Matthew Lang, Preston (GB); Ruben James Joseph Fernandes, Sale (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 13/702,647

(22) PCT Filed: Jul. 19, 2011

(86) PCT No.: PCT/GB2011/051355
§ 371 (c)(1),
(2), (4) Date: Dec. 7, 2012

(87) PCT Pub. No.: WO2012/010882
PCT Pub. Date: Jan. 26, 2012

(65) Prior Publication Data
US 2013/0082144 A1 Apr. 4, 2013

(30) Foreign Application Priority Data

Jul. 23, 2010 (GB) .................................. 1012552.4
Nov. 11, 2010 (EP) .................................. 10275116

(51) Int. Cl.
*B64C 1/12* (2006.01)
*B64C 1/40* (2006.01)
(Continued)

(52) U.S. Cl.
CPC ... *B64C 1/40* (2013.01); *B05D 5/06* (2013.01); *B29C 65/562* (2013.01); *B29C 65/565* (2013.01); *B29C 66/43441* (2013.01); *B29C 66/474* (2013.01); *B29C 66/7212* (2013.01); *B29C 66/723* (2013.01);
(Continued)

(58) Field of Classification Search
USPC .......... 52/782.1, 783.1, 794.1; 244/132, 131, 244/119, 117 R, 133, 129.1; 428/319.1, 99; 29/897
See application file for complete search history.

(56) References Cited

U.S. PATENT DOCUMENTS 2,387,219 A * 10/1945 Wallis ..................... 244/117 R
2,607,447 A *  8/1952 Tuttle ....................... 52/787.12
(Continued)

FOREIGN PATENT DOCUMENTS

EP       1719698 A1    11/2006
EP       1719924 A1    11/2006
(Continued)

OTHER PUBLICATIONS

International Preliminary Report on Patentability (Form PCT/IB/373) and the Written Opinion of the International Searching Authority (Form PCT/ISA1237) dated Jan. 23, 2013, issued in corresponding International Application No. PCT/GB2011/051355. (9 pages).
(Continued)

*Primary Examiner* — James Ference
(74) *Attorney, Agent, or Firm* — Maine Cernota & Rardin

(57) ABSTRACT

The invention provides an arrangement and methods for thermally insulating aircraft, particularly but not exclusively for when the aircraft is operating in extremely hot or cold conditions, and describes an aircraft skin construction including a foam-stiffened CFC sandwich panel forming part of the aircraft outer skin mounted to an underlying load bearing aircraft structure, wherein the panel at the mounting to the structure includes two outer layers of CFC material with an inner layer of foam material sandwiched therebetween.

8 Claims, 2 Drawing Sheets

(51) Int. Cl.
*B05D 5/06* (2006.01)
*B29C 65/56* (2006.01)
*B32B 5/20* (2006.01)
*B32B 5/24* (2006.01)
*B64F 5/00* (2006.01)
B29C 65/00 (2006.01)
B64C 1/00 (2006.01)

(52) U.S. Cl.
CPC ............... *B29C 66/727* (2013.01); *B64C 1/12* (2013.01); *B64C 2001/0072* (2013.01); *Y02T 50/433* (2013.01); *Y02T 50/46* (2013.01); *B32B 5/20* (2013.01); *B32B 5/245* (2013.01); *B64F 5/0009* (2013.01); *Y02T 50/43* (2013.01)

(56) References Cited

U.S. PATENT DOCUMENTS

| | | | | |
|---|---|---|---|---|
| 2,912,724 | A * | 11/1959 | Wilkes | 52/302.3 |
| 3,020,986 | A * | 2/1962 | Kirk et al. | 52/793.1 |
| 3,064,317 | A * | 11/1962 | Dobson | 52/404.1 |
| 4,556,592 | A * | 12/1985 | Bannink, Jr. | 428/43 |
| 4,653,246 | A * | 3/1987 | Hepler | 52/787.11 |
| 4,751,979 | A * | 6/1988 | Wiseman | 181/213 |
| 5,014,934 | A * | 5/1991 | McClaflin | 244/132 |
| 5,577,688 | A * | 11/1996 | Sloan | 244/117 R |
| 6,375,120 | B1 | 4/2002 | Wolnek | |
| 6,565,942 | B2 * | 5/2003 | Anderson et al. | 428/73 |
| 7,025,305 | B2 * | 4/2006 | Folkesson et al. | 244/117 R |
| 7,291,373 | B2 * | 11/2007 | Bartley-Cho et al. | 428/61 |
| 7,584,582 | B1 * | 9/2009 | Hutter, III | 52/506.02 |
| 8,490,365 | B2 * | 7/2013 | Mueller et al. | 52/783.1 |
| 2001/0035266 | A1 * | 11/2001 | Kennedy | 156/331.4 |
| 2005/0005544 | A1 * | 1/2005 | Borowiecki et al. | 52/204.5 |
| 2006/0248853 | A1 * | 11/2006 | Bartley-Cho et al. | 52/782.1 |
| 2006/0248854 | A1 * | 11/2006 | Bartley-Cho et al. | 52/782.1 |
| 2009/0081400 | A1 * | 3/2009 | Wolf et al. | 428/57 |
| 2009/0146008 | A1 * | 6/2009 | Thiele | 244/119 |
| 2010/0170994 | A1 | 7/2010 | Burns et al. | |
| 2012/0056037 | A1 | 3/2012 | Dolzinski et al. | |
| 2013/0082144 | A1 * | 4/2013 | Lang et al. | 244/132 |

FOREIGN PATENT DOCUMENTS

| | | |
|---|---|---|
| FR | 2712356 A1 | 5/1995 |
| GB | 1138962 A | 1/1969 |
| JP | 2006-281664 A | 10/2006 |
| SU | 533004 A1 | 10/1991 |
| WO | WO 2010/106040 A2 | 9/2010 |

OTHER PUBLICATIONS

International Search Report (PCT/ISA/210) issued on Oct. 31, 2011, by the European Patent Office as the International Searching Authority for International Application No. PCT/GB2011/051355.
European Search Report issued Oct. 20, 2011 for European Application No. 10275116.1.
Great Britain Search Report Issued Nov. 15, 2010 for Great Britain Application No. 1012552.4.

* cited by examiner

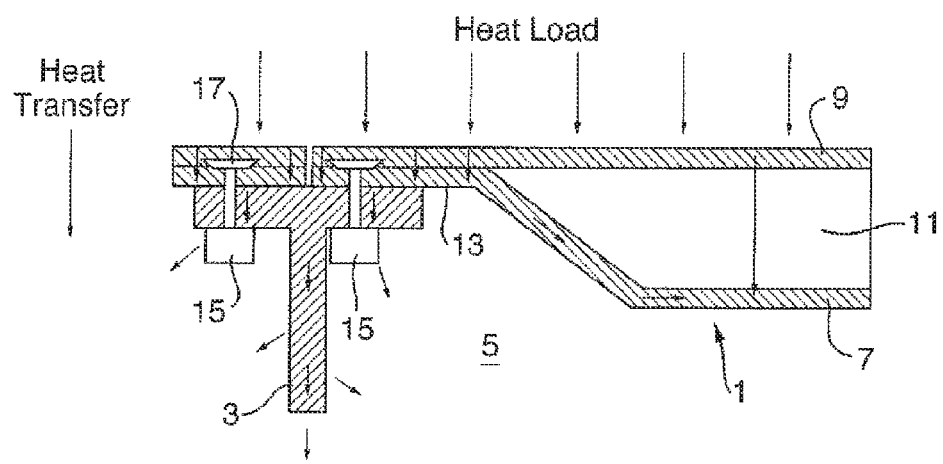
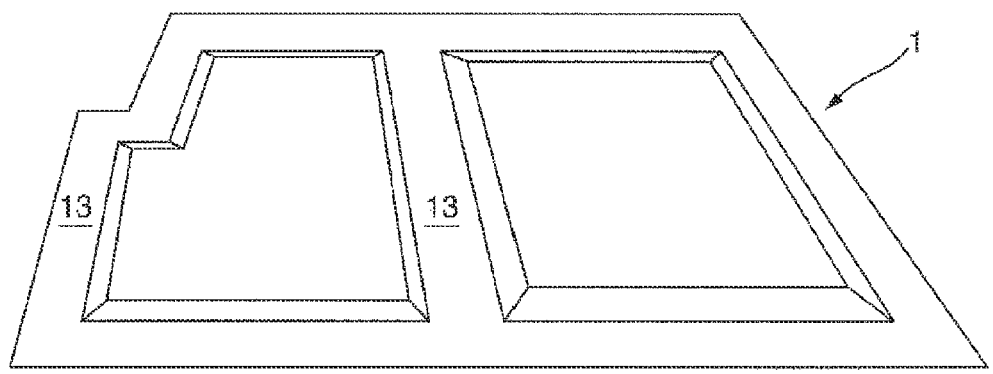

AIRCRAFT THERMAL INSULATION

This invention relates to the thermal insulation of aircraft, particularly but not exclusively applicable where the aircraft is to fly in high or low ambient temperatures or conditions.

Aircraft typically comprise an aircraft skin, which is made up of a number of shaped panels, which is fixed to an underlying structure. Such an arrangement gives the aircraft its external shape or appearance, and provides the aircraft with much of the required mechanical strength and rigidity. The underlying structure is usually load-bearing and supports all of the aircraft systems and contents (such as engine(s), avionics systems, hydraulic systems, payload, fuel, passengers/crew and so on) within the space enclosed by the aircraft skin. Many of the aircraft systems, and some contents, generate heat when the aircraft is in flight, and in order for the aircraft systems to operate effectively, an Environmental Control System (ECS) is provided to handle the internally-generated heat and to maintain the aircraft systems at an acceptable operating temperature. However, in extreme, hot climates, the air temperature in which the aircraft flies can be as much as 45° C. In addition, there is a kinetic heating effect caused by aerodynamic friction as the aircraft moves through the air and there is the effect of solar heating—in non-temperate zones, this can amount to about 1 kW/m$^2$ acting on the outer surface of the aircraft. These external heating factors act upon the external skin of the aircraft, with the result that any thermal energy transferred through the aircraft skin adds to the heat load which the ECS has to deal with in order for the internal aircraft systems to operate effectively. An increased heat load means that the ECS has to be more powerful to be effective, so the ECS requires more power to operate, which requires more power to be drawn from the aircraft power unit, which in turn adversely affects the aircraft performance characteristics (such as the aircraft weight, range, endurance, speed and/or payload).

Many modern aircraft have a skin design in which Carbon Fibre Composite (CFC) skin panels are mounted to an underlying structure which is formed of metal or metallic alloy. The CFC panels consist of outer layers of CFC material, which sandwich a layer of polymeric foam material; in use, the outer high strength CFC layers take up bending stresses and give the panel a hard wearing surface, while the light foam core absorbs shear stresses generated by loads on the panel and distributes them over a larger area. The complete arrangement provides a low weight skin panel with excellent mechanical properties, suitable for high performance aerospace applications.

The CFC sandwich panels (one is shown in FIG. 1b) are conventionally provided with an inner foam layer only in those areas where they do not overlie the underlying metallic structure. This is because, where the panels overlie the structure, they are intended to be fastened; in order to give the entire arrangement the required mechanical strength, the panels are fastened tightly to the structure. If the skin panel consisted entirely of CFC/foam sandwich, the compressive stresses created by the fasteners would tend to crush the foam and deform the outer surface of the panel forming the aircraft skin, with adverse consequences to the mechanical strength of the arrangement and to the smooth aerodynamic outer surface of the aircraft. Accordingly, the CFC sandwich panels are manufactured with foam material in those areas which do not directly overlie the underlying metallic structure; the panels are formed with monolithic CFC "landings" (reference numeral 13 in FIG. 1b), where there is no sandwiched foam material. These landings can be drilled to provide holes for fasteners to fasten the panels to the structure, as shown in FIG. 1a (which shows in cross-section parts of two adjacent CFC skin panels mounted to the underlying structure).

The thermal conductivity of foams used in SFC sandwich panels is typically of the order of 0.035 W/mK, but the thermal conductivity of the CFC is typically between one and two orders of magnitude higher. Thus, in those areas of the CFC sandwich panel containing foam material, the CFC sandwich panel acts effectively as a thermal insulator. However, where the CFC panel "landings" are mounted to the underlying metallic structure, as shown in FIG. 1a, the CFC material and the fasteners are effective at conducting and transferring external heat (the "heat load" in the Figure) to the underlying aircraft structure and into the interior of the aircraft, thereby adding to the load on the ECS. Although there is some heat transfer through the foam material, the majority of the heat transfer occurs across the CFC material and into the metallic structure; there is also some heat transfer along the inner CFC layer and thence into the interior of the aircraft.

It might be thought straightforward to address this problem by providing a thermally insulating shim between the CFC material and the metallic structure, and a thermally insulating layer on the inner surface of the CFC panel. However, this would require manufacture of a shim, and/or the redesign of the structure and/or the CFC panel in order to accommodate the extra elements without changing the external dimensions of the aircraft, increased fastener/bolt length, an increase in overall aircraft weight and a decrease in the internal volume of the aircraft, all of which are undesirable.

The present invention provides an aircraft skin construction and methods of aircraft construction which represent improvements to the state of the art.

According to one aspect, the present invention provides an aircraft skin construction comprising a foam-stiffened CFC sandwich panel forming part of the aircraft outer skin mounted to an underlying load bearing aircraft structure, wherein the panel at the mounting to the structure comprises two outer layers of CFC material with an inner layer of foam material sandwiched there between.

Such an arrangement utilises the thermally insulating properties of the foam material to limit the conduction and transfer of external heat into the aircraft interior. As a result, the aircraft ECS does not have to deal with the external heat load in addition to the heat generated inside the aircraft.

The foam material layer may extend substantially continuously across the panel. This makes for ease of manufacture of the CFC sandwich panel and does away with the monolithic CFC landings required in conventional arrangements. The foam material is relatively light in weight, and therefore the increase in overall weight is slight.

The panel may be mounted to the load bearing aircraft structure using fasteners or it may be bonded thereto. Alternatively, the panel may be bonded to a fixing member which is, in turn, fastened to another part of the aircraft structure.

The inner layer of CFC material may be made thicker adjacent the underlying structure than at locations distanced from the underlying structure. This permits fasteners to act upon (and extend through) the underlying structure and the layer of CFC material immediately adjacent, and does not compromise the mechanical properties of the arrangement as compared with the conventional arrangement (as in FIG. 1a). The fastening arrangement has several advantages: the fasteners can be made shorter than in the conventional arrangement (which, over an entire aircraft, represents a considerable saving in weight), and the outermost part of the fastener, the head abutting the outer surface of the inner CFC layer, does not have to be countersunk into the CFC layer (as shown in FIG. 1a) in order to provide a smooth, aerodynamic outer aircraft surface, but instead it can be of a much simpler, "panhead" type because in use it is inside the CFC panel.

A hole may be formed in the foam material and in the outer CFC layer overlaying the or each fastener, for ease of applying the fastener. This hole may be filled with a plug of foam material, which can be capped with a covering of resin or a flexible sealant so as to provide a smooth surface finish to the exterior surface of the outer CFC layer forming the aerodynamic outer aircraft surface.

If two sandwich panels are mounted in edge abutment along the underlying structure (as shown in relation to the prior art in FIG. 1a) any gap between the panels may be filled with the application of adhesive, sealant and/or joining compound, so as to enhance the structure strength of the arrangement, provide a smooth outer aircraft surface and/or prevent heat ingress.

In another aspect the invention provides a method of aircraft construction comprising forming a foam-filled CFC sandwich panel and mounting it to an underlying aircraft structure to form part of the aircraft outer skin, the panel being formed so that where it is to be mounted to the structure the panel comprises two outer layers of CFC material with an inner layer of foam material sandwiched there between.

Although so far described in relation to aircraft operations in hot climates, it will be appreciated that the present invention is advantageous in cold climates and/or at high altitudes, where the ambient temperature may be as low as −77° C. When operating in such cold conditions, aircraft constructed in accordance with the invention have greater thermal insulation to inhibit heat transfer from within the aircraft interior to the surrounding atmosphere (the reverse of the situation shown in FIG. 1a), with the consequence that the ECS does not have to generate heat in order to maintain the aircraft systems at an effective operating temperature and/or to keep the aircraft contents from freezing (aircraft fuel typically begins to "wax" and not flow freely when the fuel temperature falls below about −44° C., and crew/passengers operate less effectively if the aircraft internal temperature falls below about 5-10° C.). The present invention enables the aircraft to be substantially uniformly thermally insulated over its entire outer surface, so that the heat loss is reduced to a constant level over the skin surface, according to the thermal conductivity of the foam material.

The invention will now be described, by way of example only, with reference to the accompanying drawings, in which:

FIG. 1a is a cross sectional view of the prior art in which parts of two CFC sandwich panels are mounted in edge-abutting relationship along a metallic structure to form an aircraft skin;

FIG. 1b is a schematic view of a prior art CFC sandwich panel for use in an aircraft skin construction;

Figure 2:
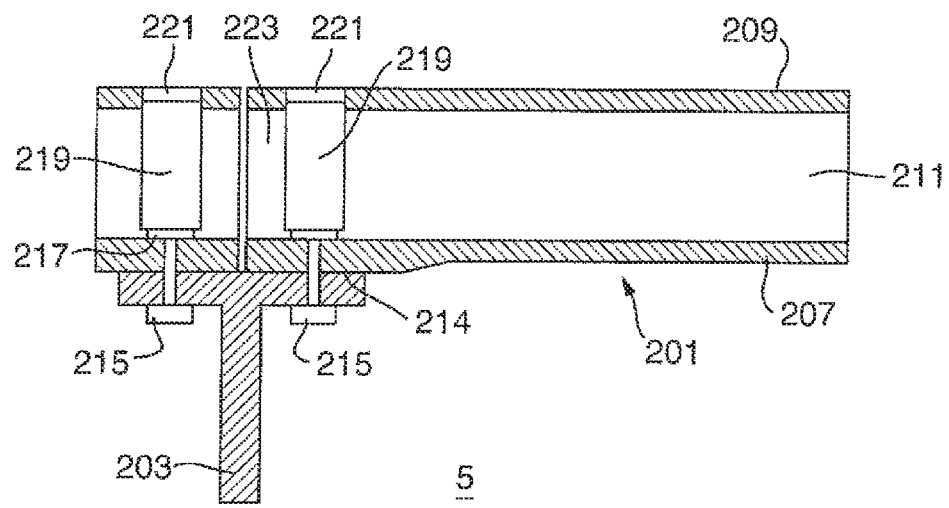
FIG. 2 is a cross-sectional view of an aircraft skin arrangement constructed in accordance with the present invention.

FIG. 1a shows a carbon fibre composite (CFC) sandwich skin panel 1 mounted to an underlying metallic or alloy structure 3 to form part of an aircraft skin (for the avoidance of doubt the sealed interior of the aircraft is denoted by reference 5). The panel 1 comprises inner and outer CFC layers 7, 9 (the outermost surface of outer layer 9 forming the external surface of the aircraft, which is then usually coated with protective paints or other coatings) with a layer of foam material 11 sandwiched therebetween, the elements being fixed together with an adhesive (the choice of adhesive is typically dictated by the foam/CFC material used and the temperature that the panel will be exposed/cured to. A common foam/CFC combination is DIAB HP80/MTM46. For this application, MTA240 film adhesive is used (MTM46 and MTA240 are both products of Advanced Composites Group, of the United Kingdom)). The CFC material is of standard manufacture, the foam material is of a commercially available type, such as DIAB HP80, DIAB F or Rochacell XT-HT ("DIAB" is a trade mark of DIAB Group AB, of Sweden, and "Rohacell" is a trade mark of Evonik Industries AG, of Germany).

Where the panel 1 is designed to overlie and be mounted to the metallic structure 3 there is no inner foam sandwich, instead the panel 1 is formed with monolithic CFC landings 13, where the panel 1 consists of only the two CFC layers 7, 9. Holes are drilled through the landings 13 and the structure for metallic fasteners 15 fasten the skin panels 1 to the structure 3. The heads 17 of the fasteners are countersunk into the CFC landings so as to provide a smooth and aerodynamic aircraft outer surface (the outer surface of the fastener heads 17 are usually flush with the outer surface of the outer CFC layer 9, rather than as is shown in FIG. 1a).

As shown by the arrows in FIG. 1a, external heat load acts on the outside of the aircraft skin and heat is transferred into the aircraft interior 5 by conduction through the CFC landings 13 and the structure 3, and through the fasteners 17. A small amount of heat is conducted through the foam layer 11, but this is relatively insignificant compared to the heat transferred via the landings 13 and fasteners 15.

FIG. 1b shows the exterior of the inside of a typical prior art CFC skin panel 1 (the inside of the panel defining the interior of the vehicle) and illustrates the landings 13, where the panel consists of only CFC material, and the other areas where foam material is sandwiched between the CFC layers.

In the arrangement shown in FIG. 2, a CFC skin panel 201 consists of inner and outer CFC layers 207, 209 which sandwich a foam layer 211. Layers 207, 209 and 211 may be formed of the same types of materials as in the arrangement shown in FIG. 1a. However, in the FIG. 2 arrangement the skin panel 201 is of substantially constant thickness (apart from the landing 214 on the inner layer 207 as will be described) and the foam material layer 211 extends across the entire panel 201. The panel 201 is mounted to the underlying metallic or alloy structure 203 by fasteners 215 extending through the landing 214 and the structure 203, however these fasteners 215 are shorter than those in the prior art arrangement, and act on the inner CFC layer 207 only and on the structure 203, the inner CFC layer 207 being made thicker in the area of the landing 214 so as to provide the required structural strength. Because the outer part 217 of the fasteners 215 sit within the CFC panel 201, they do not require countersinking, but can be more easily fitted and cheaply made with a flat, pan head 217.

To assemble the arrangement as shown in FIG. 2, holes are drilled in the outer CFC layer 209 and the foam layer 211 so that the fasteners 215 can be applied. Once the fasteners 215 are in place, the hole in the foam layer 211 is filled with a plug 219 of foam material (usually of the same material as the foam of layer 211) which is sized to provide an interference fit with the hole in the foam layer 211. The outer surface of the hole is then provided with a cap 221, either with a hard resin such as Hysol (Hysol is a trade mark of Henkel Corporation, of USA) or with a flexible sealant such as a polysulphide rubber compound, to give the outer surface of the aircraft a smooth surface finish.

As in FIG. 1a, FIG. 2 shows two skin panels 201 in abutting relationship along their edges and the structure 203. At the abutment 223 of these panels 201 an adhesive and/or sealant is provided (not shown) to join the adjacent panels 201 together, to fill any gaps between the panels and provide thermal insulation to prevent heat transfer through the arrangement, and to ensure that there is an aerodynamic and smooth outer aircraft surface.

The arrangement of FIG. 2 significantly reduces heat transfer through the aircraft outer skin to or from the aircraft interior 5. As described above, this is particularly advantageous when the aircraft is operating in extremely hot or cold conditions, but it ensures that the ECS operates under constant temperature loading in any external conditions.

It will be appreciated that, if the structures 3 and 203 are identical in size, adopting the arrangement of FIG. 2 will increase the overall aircraft volume by approximately the thickness of the foam layer 211, but this will be accompanied by a small increase in the available volume in the aircraft interior 5. Alternatively, if the structure 203 is made slightly smaller to maintain the overall aircraft volume constant then the available volume in the aircraft interior 5 will be reduced slightly (by the volume in the region of the landings 13 in the FIG. 1a view); however, this would be compensated for to an extent by the reduction in weight of the slightly smaller structure 203. It is a design decision as to which option is most appropriate.

Figure 3:
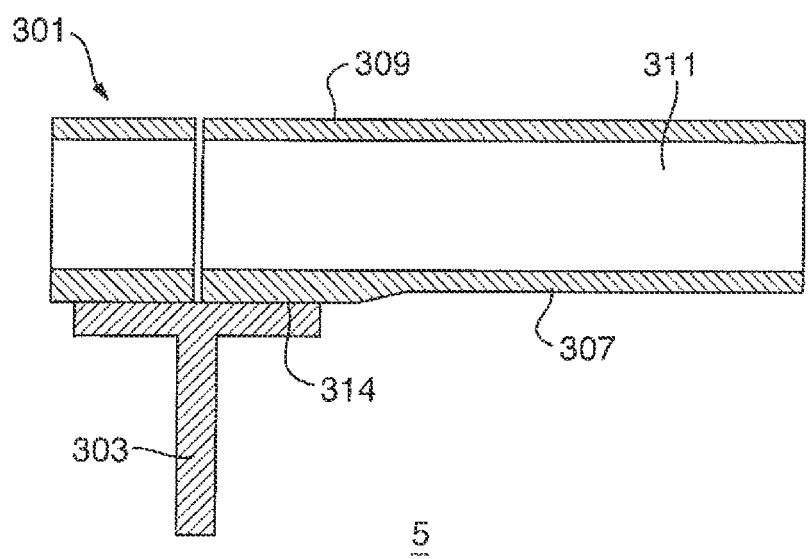
FIG. 3 is a cross-sectional view of an alternative aircraft skin arrangement.

In the arrangement shown in FIG. 3, a CFC skin panel 301 consists of inner and outer CFC layers 307, 309 which sandwich a foam layer 311. Layers 307, 309 and 311 may be formed of the same types of materials as in the arrangement shown in FIGS. 1a and 2. However, in the FIG. 3 arrangement the skin panel 301 is mounted to the underlying metallic or alloy structure 303 directly by bonding a surface between the landing 314 and the structure 303. Alternatively, the skin panel 301 may be bonded to a fixing member (not shown) such as a "J" spar which is, in turn, fastened to another part of the aircraft structure.

Although the present invention has been described as applied to an aircraft, manned or unmanned, those skilled in the art will understand that the invention is equally applicable to other applications, such as, cars, boats and the like, which utilise CFC foam sandwich skin panels mounted to an underlying, thermally-conductive structure.

The invention claimed is:
1. An aircraft skin construction comprising:
a foam-stiffened CFC sandwich panel, the panel comprising:
an inner CFC layer comprising a landing, wherein the landing has a thickness that is greater than a thickness of the inner CFC layer;
an outer CFC layer; and
a foam material layer sandwiched between the inner CFC layer and the outer CFC layer, the foam material layer extending continuously across the panel
an underlying load bearing aircraft structure comprising a flange;
wherein the flange is connected to the landing of the inner CFC layer; and
one or more fasteners, wherein each of the one or more fasteners comprises a main body, a first flat end and a second flat end;
wherein the first flat end abuts said flange, the second flat end abuts the landing, and the main body extends transversely through said landing of said inner CFC layer, and through said flange; and said one or more fasteners extend transversely only through said flange and said landing.

2. An aircraft skin construction as claimed in claim 1, wherein said sandwich panel comprises two sandwich panels mounted to the underlying structure so that the two panels abut.

3. An aircraft skin construction as claimed in claim 2, wherein one or more of an adhesive, a sealant and a joining compound is applied between the two panels.

4. An aircraft comprising the aircraft skin construction as claimed in claim 1.

5. A method of constructing an aircraft comprising:
forming a foam-filled CFC sandwich panel comprising:
an inner CFC layer comprising a landing, wherein the landing has a thickness that is greater than a thickness of the inner CFC layer;
an outer CFC layer; and
a foam material layer sandwiched between the inner CFC layer and the outer CFC layer, the foam material layer extending continuously across said panel;
forming a hole in the panel through the outer CFC layer and the foam material layer;
arranging one or more fasteners to extend through the landing of the inner CFC layer, and through an underlying load bearing aircraft structure, thereby mounting the panel to the underlying aircraft structure to form part of an aircraft outer skin;
wherein the one or more fasteners do not extend through the foam material layer, and said one or more fasteners only extend through the flange and the landing.

6. A method according to claim 5, comprising filling the hole in the panel with a foam material.

7. A method according to claim 6, comprising capping the hole above the foam material with a filler so as to produce a smooth surface finish on an outer surface of the sandwich panel forming the aircraft outer skin.

8. A method according to claim 5, wherein said mounting of said sandwich panel comprises mounting said sandwich panel comprising two abutting panels to the underlying load bearing aircraft structure so that edges of the panels abut in a line overlying the structure, and applying a material into the line between the panel edges so as to join the edges of the abutting panels, to seal a gap between the abutting panels and to provide a smooth outer aircraft surface.

* * * * *